Figure 1:
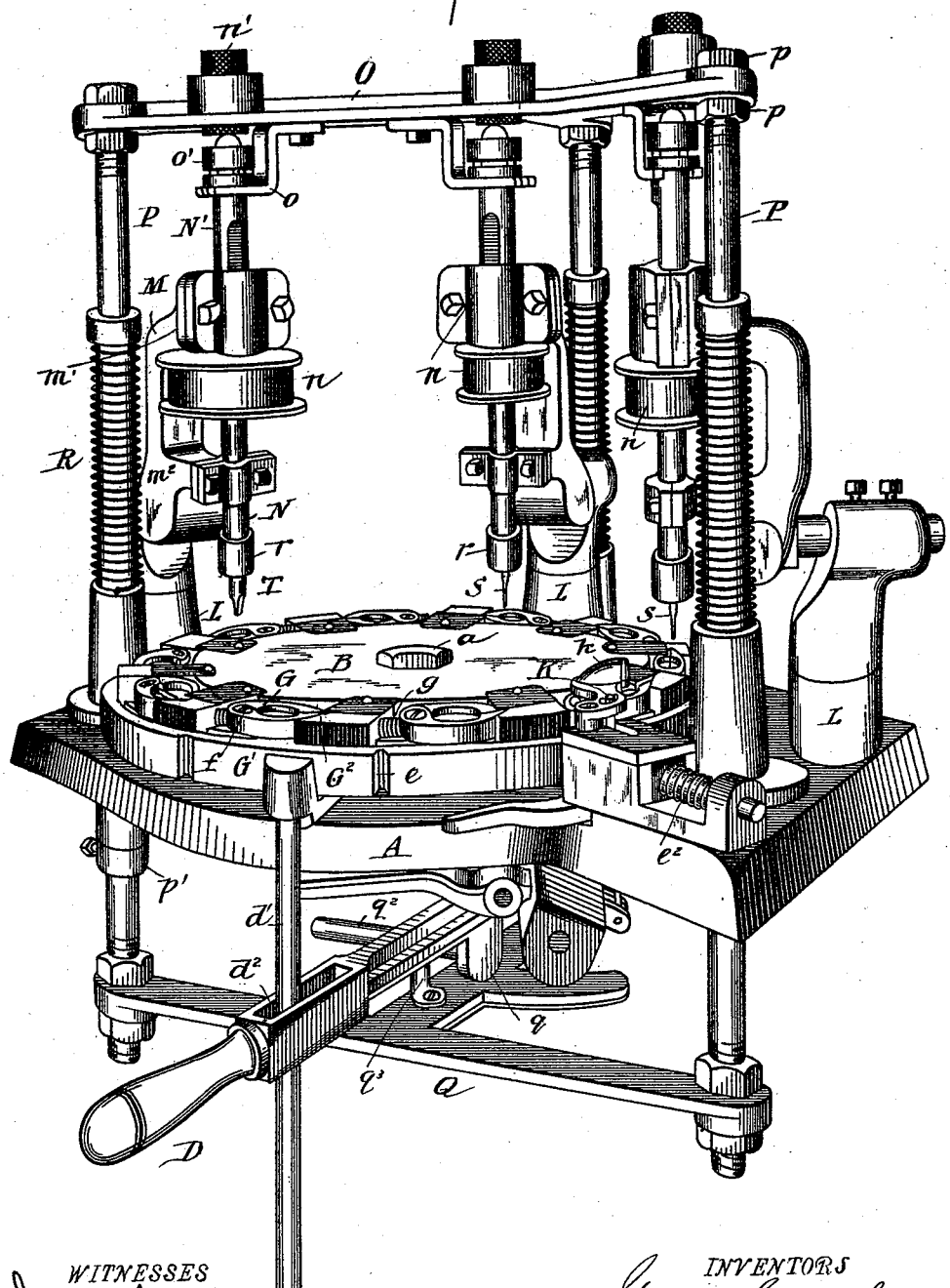

(No Model.) 8 Sheets.—Sheet 1.

G. CARLYLE & W. NAGEBORN.
BUTTON MAKING MACHINE.

No. 554,052. Patented Feb. 4, 1896.

WITNESSES
Norris H. Clark
N. F. Oberle

INVENTORS
George Carlyle
Wilhelm Nageborn
By Dyer & Seely Attys (No Model.) 8 Sheets—Sheet 2.
G. CARLYLE & W. NAGEBORN.
BUTTON MAKING MACHINE.
No. 554,052. Patented Feb. 4, 1896.
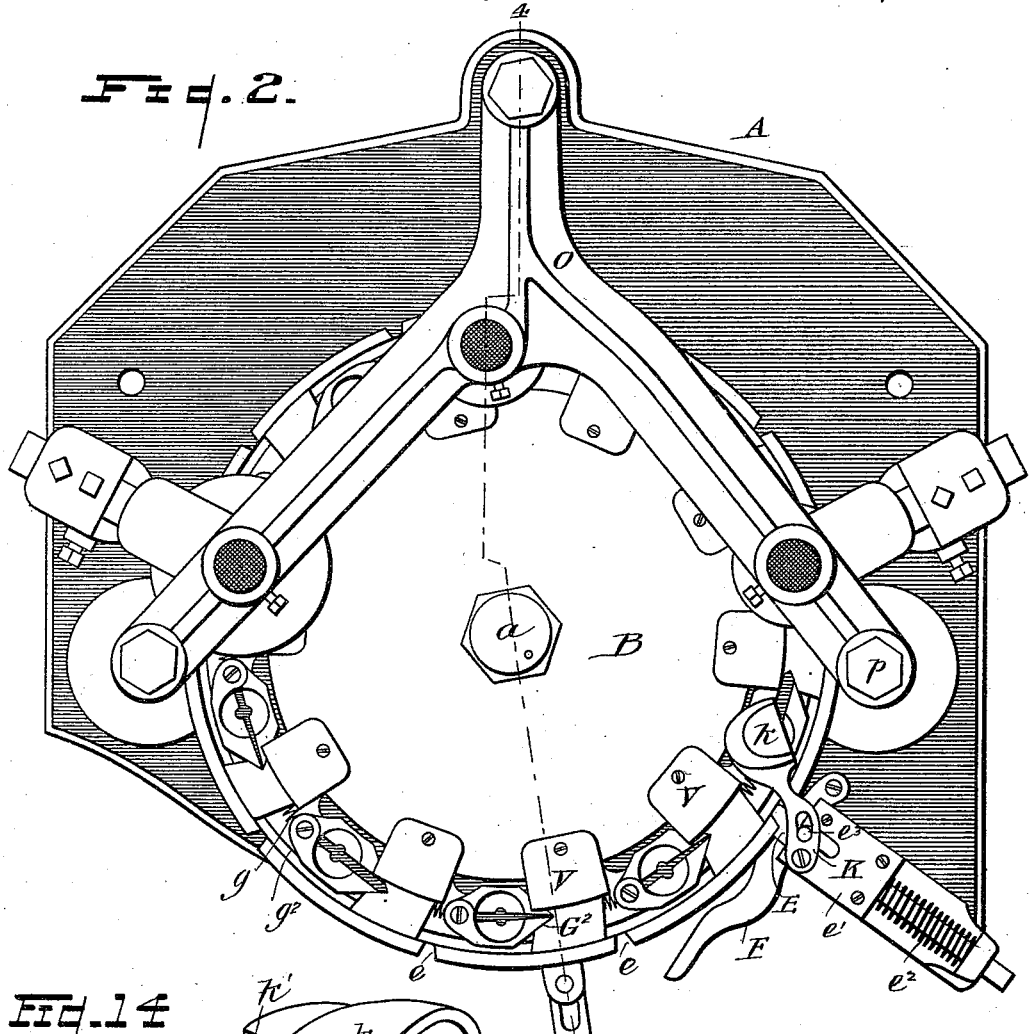
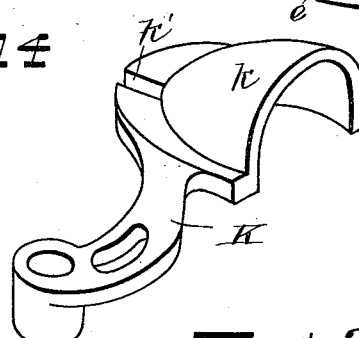
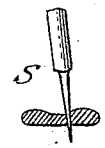
WITNESSES
INVENTORS (No Model.) 8 Sheets—Sheet 3.
G. CARLYLE & W. NAGEBORN.
BUTTON MAKING MACHINE.
No. 554,052. Patented Feb. 4, 1896.
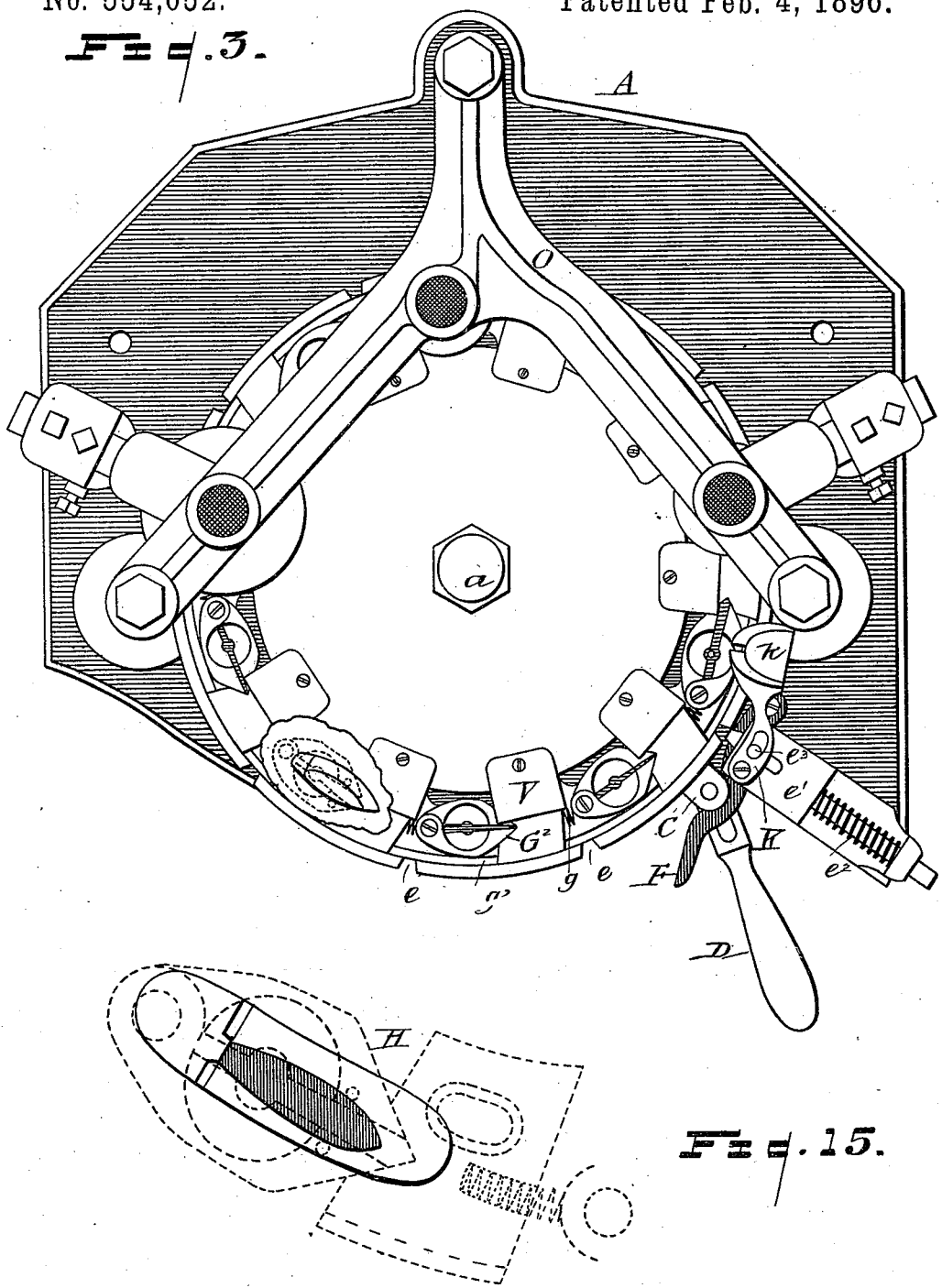
WITNESSES
Norris H. Clark.
N. F. Oberly
INVENTORS
George Carlyle
Wilhelm Nageborn
By Dyer & Seely Attys

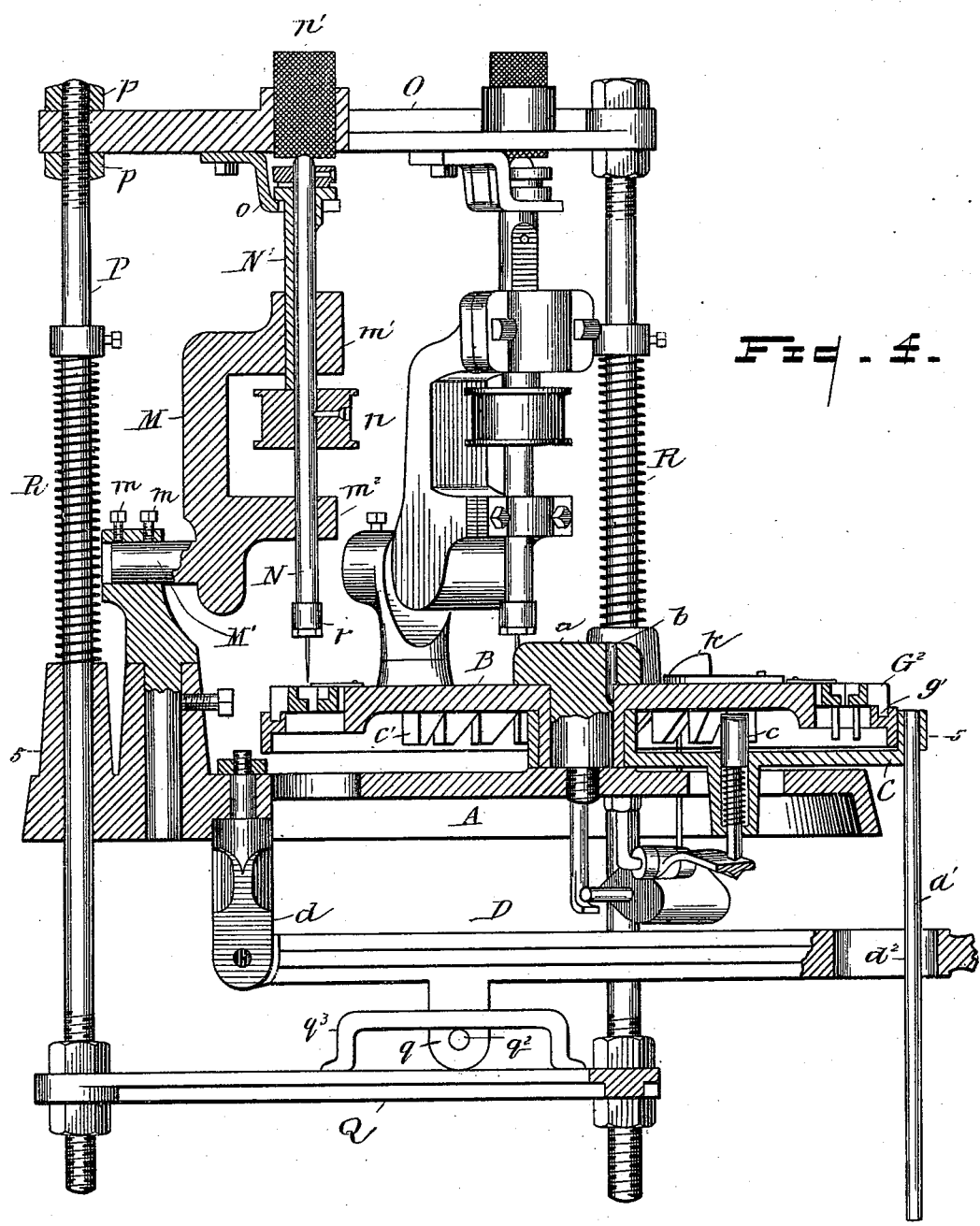

(No Model.)  8 Sheets—Sheet 5.
G. CARLYLE & W. NAGEBORN.
BUTTON MAKING MACHINE.
No. 554,052. Patented Feb. 4, 1896.
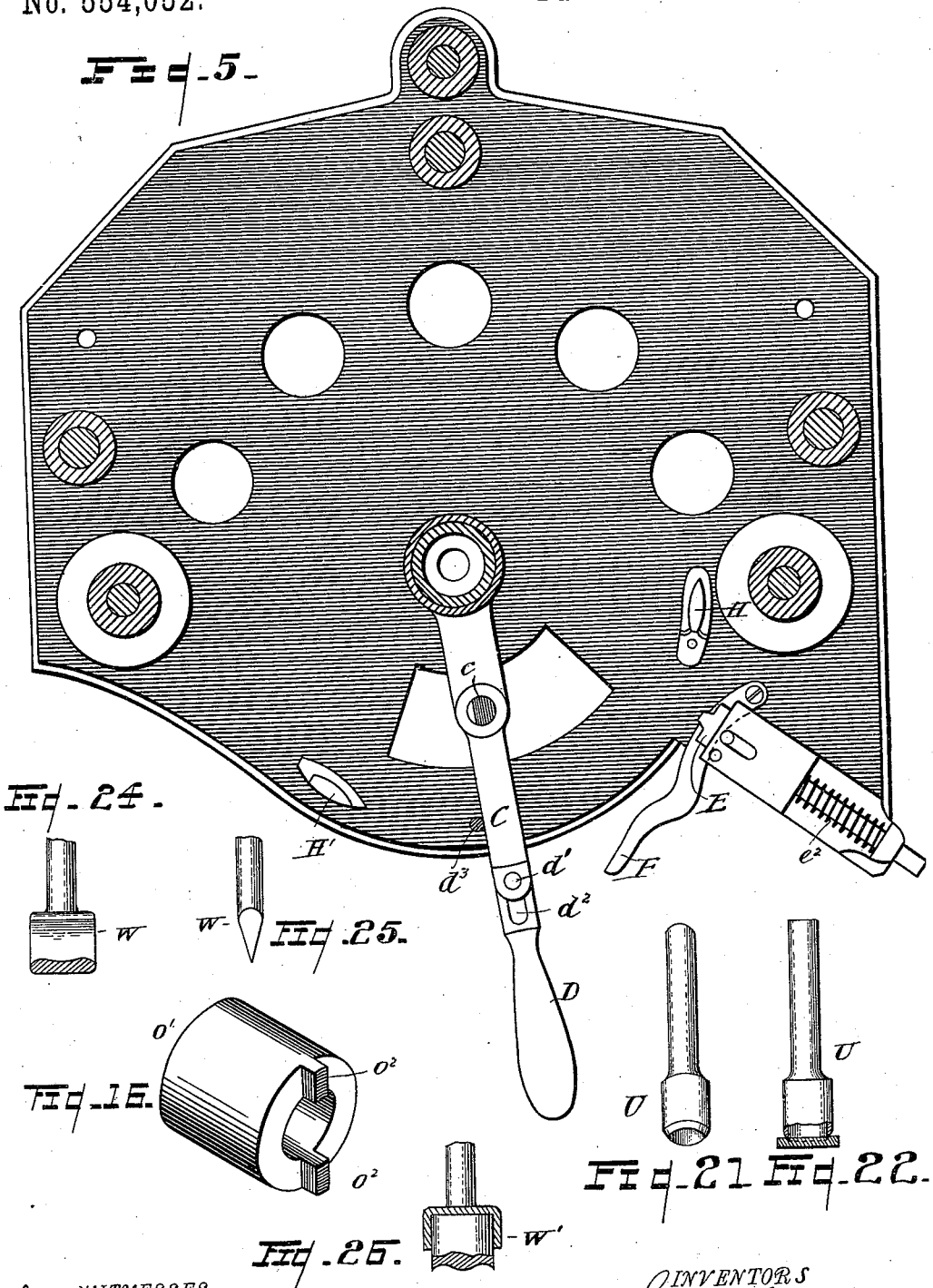

(No Model.) 8 Sheets—Sheet 6.
G. CARLYLE & W. NAGEBORN.
BUTTON MAKING MACHINE.
No. 554,052. Patented Feb. 4, 1896.
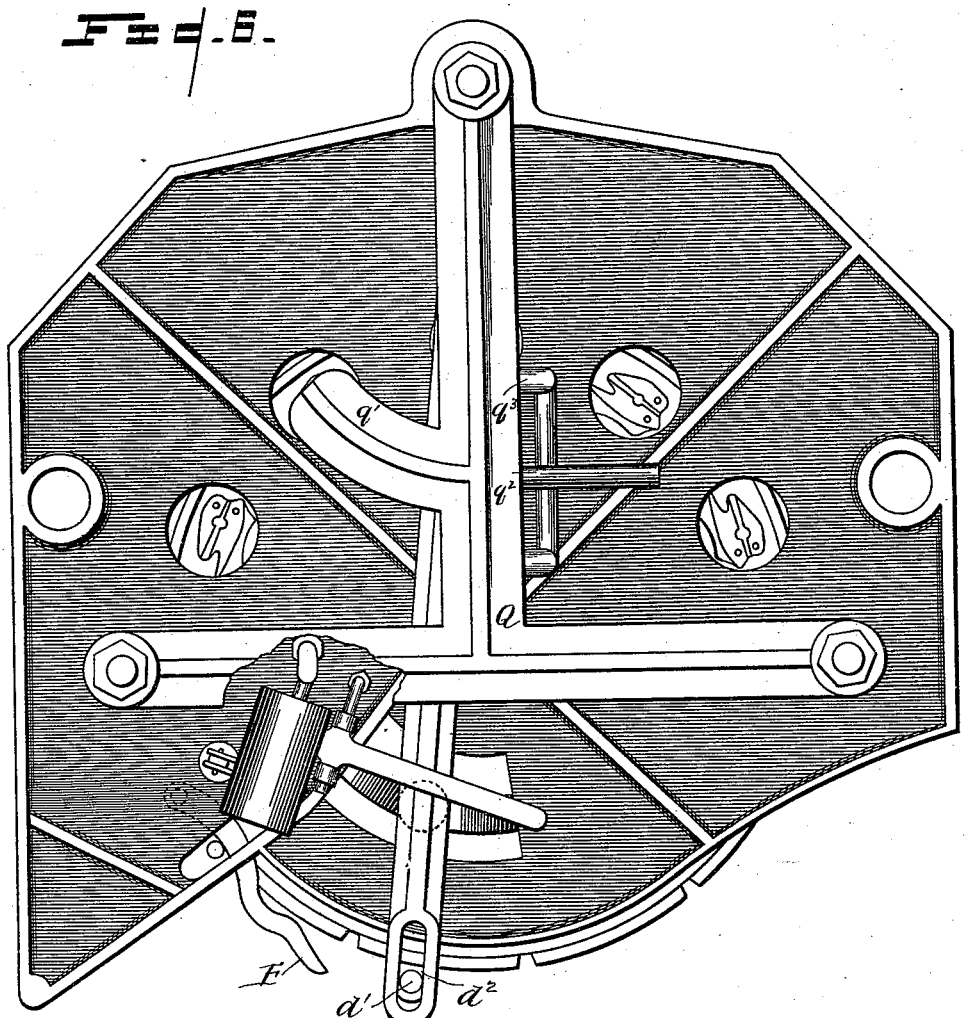
Fig. 6.
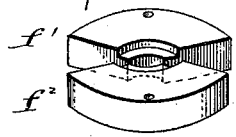
Fig. 18.
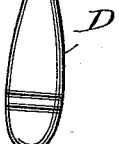
Fig. 17.
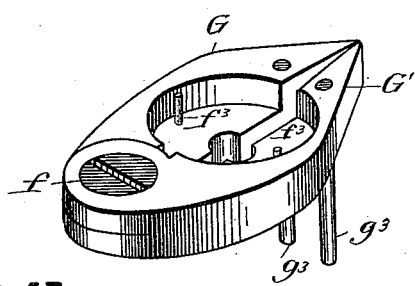
WITNESSES
Norris A. Clark.
N. F. Oberle'
INVENTORS
George Carlyle
Wilhelm Nageborn
By Dyer & Seely Attys.
ANDREW B.GRAHAM. PHOTO-LITHO. WASHINGTON,D.C.

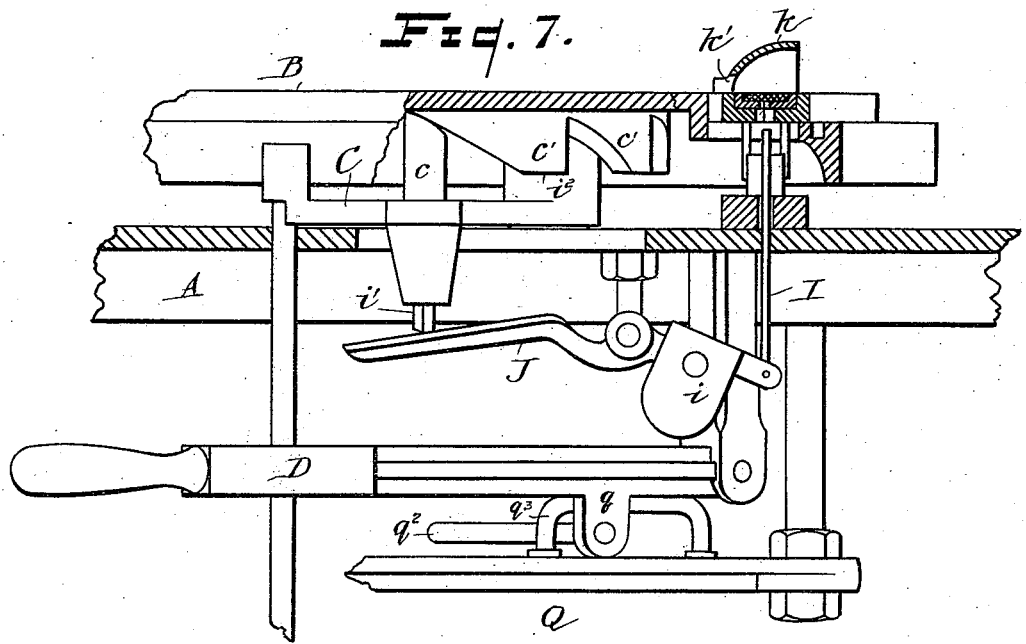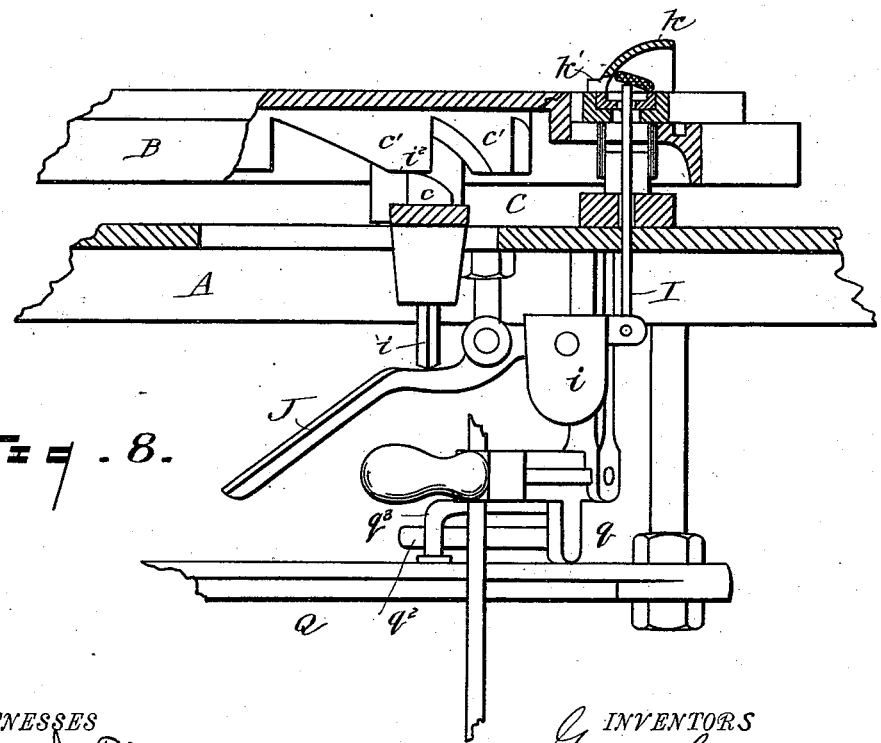

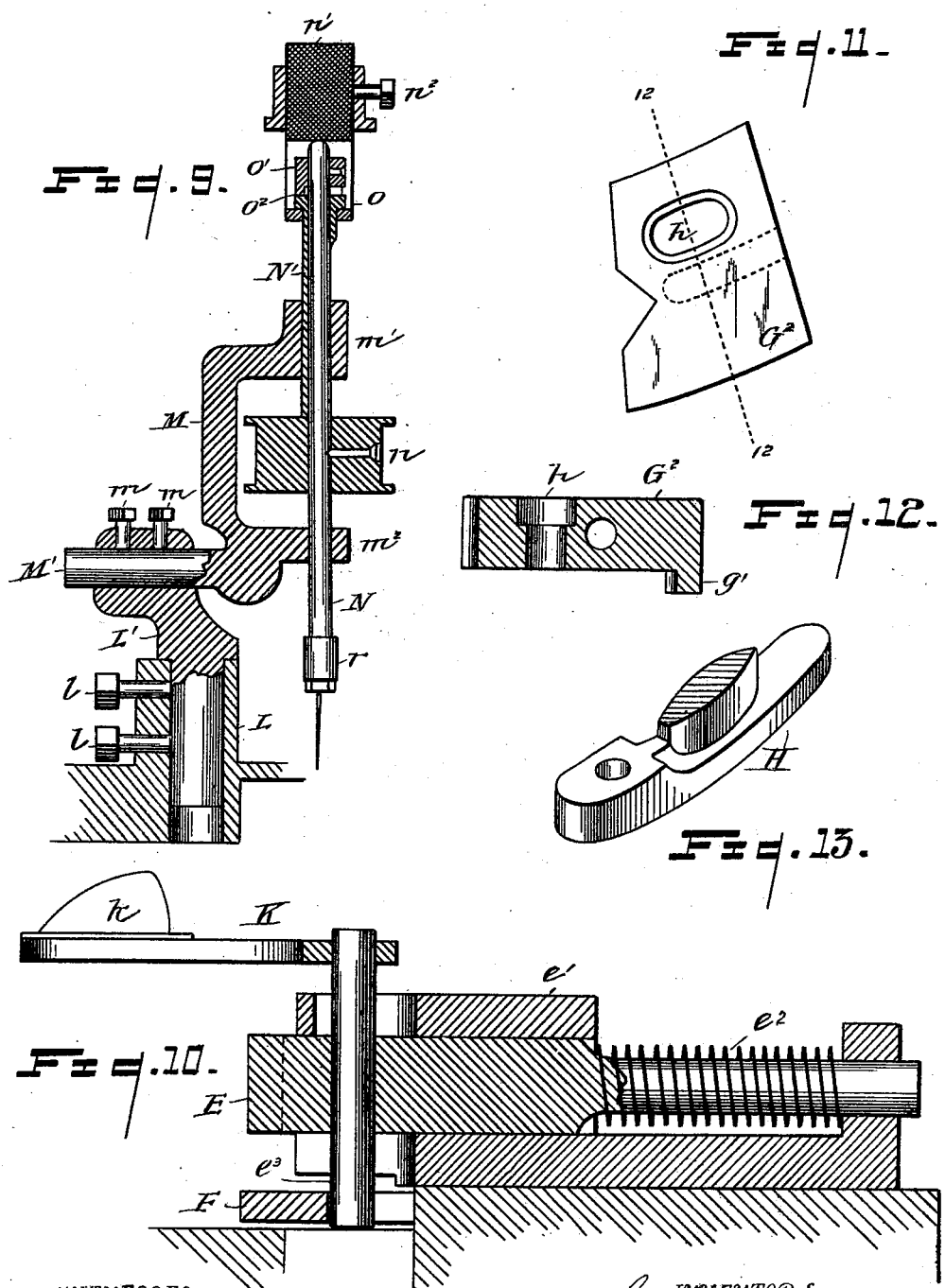

UNITED STATES PATENT OFFICE.

GEORGE CARLYLE AND WILHELM NAGEBORN, OF DETROIT, MICHIGAN, ASSIGNORS TO THE STANDARD PEARL BUTTON COMPANY, LIMITED, OF SAME PLACE.

BUTTON-MAKING MACHINE.

SPECIFICATION forming part of Letters Patent No. 554,052, dated February 4, 1896.

Application filed May 23, 1892. Serial No. 434,107. (No model.)

*To all whom it may concern:*

Be it known that we, GEORGE CARLYLE and WILHELM NAGEBORN, citizens of the United States, residing at Detroit, in the county of Wayne and State of Michigan, have invented a new and useful Improvement in Button-Making Machines, of which the following is a specification.

The object of our invention is to reduce the cost of manufacturing buttons, especially those made from mother-of-pearl, although our machine is applicable to the making of buttons from bone, vegetable ivory, and the like.

In carrying out our invention we provide a machine which acts upon two or more button-blanks simultaneously, and is so constructed and arranged in its several parts that the blanks can be delivered to and removed from the machine with rapidity, and the several operations can be performed quickly and without unnecessary loss of time.

In its general features our machine consists of a rotating horizontal table, upon the periphery of which are mounted a number of blank-holding chucks, which are automatically opened and closed at the proper intervals by the rotation of the table. Above this table are located two or more rotating drill-spindles, the number corresponding to the number of holes to be made in the button, and also preferably one or more other rotating spindles for carrying forming and centering tools. These spindles are capable of a vertical movement toward and away from the table, which movement is produced simultaneously by a suitable frame connecting all the spindles, the frame being depressed by a lever moved by the operator, and being thrown upwardly by springs when the lever is released. This same lever is also capable of a lateral oscillating movement, by means of which, through a pawl-and-ratchet device, the table is rotated with a step-by-step movement, each movement of rotation being that required to advance the chucks the definite distance required to bring a new blank under each of the tools. The lever, by its horizontal oscillating movement, also operates a device for automatically discharging the buttons from the machine. In addition to these general features the machine has many details of construction and arrangement, which will be understood by reference to the accompanying drawings, in which—

Figure 1 is a perspective view of the machine, showing the parts in position for depressing the drills. Fig. 2 is a top view of the machine with the parts in the same position as in Fig. 1. Fig. 3 is a top view of the machine with the lever at the other limit of its horizontal movement and with a part of the rotating table broken away to show one of the chuck-opening cams beneath. Fig. 4 is a vertical section of the machine, taken on the line 4 4 in Fig. 2. Fig. 5 is a horizontal section of the machine looking downwardly, taken on the line 5 5 in Fig. 4. Fig. 6 is a bottom view of the machine. Fig. 7 is a vertical section taken through the hood for discharging the buttons, and showing the lifting-rod in its depressed condition. Fig. 8 is a view similar to Fig. 7, showing the elevated position of the lifting-rod. Fig. 9 is a vertical section through one of the drill-spindles and its supporting-bracket. Fig. 10 is a section vertically through the dog for locking the rotating table at the end of each movement, showing the connection of the dog with the discharging-arm. Fig. 11 is a top view of one of the chuck-closing plates. Fig. 12 is a sectional view of one of the closing-plates on line 12 12 in Fig. 11. Fig. 13 is a perspective view of one of the chuck-opening cams. Fig. 14 is a perspective view of the discharging-arm and hood. Fig. 15 is a horizontal section through one of the chuck-opening cams, showing the chuck-jaws and closing-plate in dotted lines. Fig. 16 is a perspective view of one of the spindle-supporting collars. Fig. 17 is a perspective view of one set of chuck-jaws. Fig. 18 is a perspective view of one set of removable chuck-faces. Fig. 19 is a perspective view of a forming centering-tool. Fig. 20 shows the same tool acting on the button-blank. Fig. 21 is a perspective view of a ring-forming tool. Fig. 22 shows this second forming-tool acting on the button-blank. Fig. 23 is a view illustrating the action of one of the drilling-awls on the button-blank. Fig. 24 shows another forming-tool acting on a button-blank. Fig. 25 is a side elevation of this tool at right angles to Fig. 24. Fig. 26 is a view, partly in section, of a different forming-tool; and Fig. 27 is a face view of this last forming-tool.

A is the bed-plate of the machine, upon which is mounted a horizontal rotating table B, turning upon a central stud $a$ secured to the bed-plate. The head of this stud is pierced by a vertical oiling-hole $b$. Between the table and the bed is located an arm C, sleeved at its inner end upon the hub of the table, so as to turn upon the same center, and projecting outwardly between the bed and table toward the front of the machine and beyond the periphery of the table.

Midway of its length the arm C carries a vertically-moving dog $c$, which is pressed upwardly by a spring, Fig. 4, said dog acting as a pawl, and engaging the teeth $c'$ of a ratchet formed upon the under side of the table. The teeth of this ratchet are inclined to the right, (facing the machine,) as seen in Figs. 7 and 8, so that if a horizontal oscillating movement is imparted to the arm C the table B will be rotated from the right to the left with a step-by-step movement, each movement being equal in extent to the length of one of the teeth $c'$. This oscillating movement is imparted to the arm C by means of a hand-lever D, located beneath the bed-plate of the machine and pivoted at its inner end to a rotating stud $d$ depending from the rear of the base-plate. This hand-lever D projects forward, beneath and beyond the bed-plate, where it terminates in a handle designed to be grasped by the operator. A stiff rod $d'$, fixed to the outer end of the arm C, passes downwardly through a slot $d^2$ in the lever D, so that by moving the lever D horizontally back and forth the arm C will be given a similar movement. The slot $d^2$, however, permits the lever D to be moved vertically on its pivot in the rotating stud $d$ independently of its connection with the arm C. A stud $d^3$, rising from the base-plate, Fig. 5, limits the movement of the arm C to the left, relieving the holding-dog, about to be described, from strain. The rotating table B is provided with notches $e$ on its periphery, located a definite distance apart equivalent to the length of one of the ratchet-teeth $c'$. With these notches $e$ there engages the point of a holding-dog E, which is guided by a sleeve $e'$ mounted upon the bed-plate, and is thrown forward by a spring $e^2$. A pin $e^3$ projects downwardly upon the dog E and is engaged by a pivoted lever F, which lever is thrown outwardly to retract the dog by the rod $d'$, or the head of the arm C when that arm approaches the limit of its movement to the right.

It thus appears that by starting with the hand-lever D in the position shown in Figs. 1, 2 and 5 the hand-lever will be moved to the right, (the rotating table being held by the dog E during this movement,) and will move with it the arm C. When the limit of movement to the right has been reached, as shown in Fig. 3, the lever F will be forced outwardly, retracting the dog E and releasing the table, while the pawl $c$ will be brought into engagement with the next tooth of the ratchet $c'$. The lever D will then be moved to the left, carrying with it the arm C and rotating the table B to a new position, when the dog E being released will drop into the next notch $e$ and lock the table in the new position.

The top face of the table B is depressed at its periphery, and upon this depressed portion of the table are mounted a number of split chuck-jaws G G', which are pivoted together and to the surface of the table by studs $f$. These split chuck-jaws are provided with a two-part or split chuck-face $f'$ $f^2$, which parts are removably secured in the chuck-jaws by means of pins $f^3$, rising from the bottom of the chuck-jaws and entering holes in the two chuck-faces. These removable chuck-faces have chucking-openings of various sizes, so as to receive button-blanks of different sizes, the chuck-faces being changed whenever a different-sized button-blank is to be operated upon. The free ends of the chuck-jaws G G' are pointed, so as to form a wedge, which is embraced by a V-shaped notch in a plate $G^2$. One of the plates $G^2$ is mounted upon the depressed periphery of the table in front of each set of chuck-jaws, and is forced upon the point of the chuck-jaws by means of the spring $g$, pressing the chuck-jaws together and causing the chuck-faces to grasp and hold the button-blank. The plates $G^2$ are guided in their forward and backward movement by bearing at their inner edge against the raised center of the rotating table, and by having at their outer edge a curved rib $g'$, which enters a curved slot $g^2$ in the upper surface of the table. The guiding of these plates is desirable, so that the chuck-jaws will be held in a definite position when closed, and the tools when once set will properly act upon the button-blanks. To hold the plates $G^2$ down upon the table, screws passing through slots $h$ in the plates are employed. To open the chuck-jaws, which must be done both to receive and release the blank, two pins $g^3$ are provided, hanging downwardly from the free ends of the jaws through a slot in the table. At two points in the revolution of the table these pins are spread apart by wedge-shaped cams H H', mounted upon the bed-plate. When the pins of a set of chuck-jaws strike the point of one of these wedge-shaped cams, the pins will be forced apart and the plate $G^2$ will be forced back against the spring $g$, permitting the chuck-jaws to open. The cam H is located so as to open the jaws of each chuck as it leaves the last drilling-tool and comes into position under the discharging-arm, while the cam H' is so located as to open the jaws of each chuck before it is moved under the first tool, as shown in Figs. 2 and 3.

It will thus be seen that by the rotating movement of the table B the chuck-jaws will be opened automatically at the proper points for receiving and discharging the button-blanks. A number of the blanks will be piled upon the top of the table B, and will be drawn by the hand of the operator across the table and into the open chuck which is about to pass under the first tool. This can be done with considerable rapidity, since the blank need not be picked up by the fingers, but can be readily slid across the horizontal surface of the table by the left hand of the operator, while the right hand grasps the lever D. The buttons being discharged automatically from the machine, as will be presently described, the operator is not required to handle the buttons a second time to effect their removal, but can keep one hand at all times upon the lever D, and with the other hand can move the blanks into the open chuck. Thus great rapidity of operation is attained.

For discharging the buttons two devices are required. One is a lifting-rod which lifts the button out of the chuck-jaws of the open chuck which has just passed from under the last tool, and the other is a discharging-arm which moves horizontally across the open chuck and throws the lifted button outwardly away from the table and into a proper receptacle. The lifting-rod I, Figs. 7 and 8, is pivoted to one end of the lever J, which is hung beneath the bed-plate. The lifting-rod passes upwardly through the bed-plate A, in which it is guided, its upper end terminating directly below the open center of the chuck-jaws, which have been spread apart by the cam H. The lever J is overbalanced by a weight $i$, which keeps the lifting-rod I normally in a depressed or retracted position, so that the table B can rotate without any part striking the rod I. The end of the lever J opposite to that to which the rod I is pivoted projects beneath the shank $i'$ of the pawl $c$, which is extended through the arm C for that purpose. When the arm C is moved to the right and the pawl $c$ rides down the incline of one of the teeth $c'$, the pawl is forced downwardly to the extent of the depth of the ratchet-tooth and presses downwardly the end of the lever J on which it bears, forcing the other end of the lever upwardly and pushing the lifting-rod I through the chuck-jaws above it, lifting the button out of the chuck-jaws, as illustrated in Fig. 8. The pawl $c$ then strikes a horizontal portion $i^2$ of the ratchet-tooth, and while moving along this part of the ratchet-tooth, as shown in Fig. 8, the pawl is kept depressed and the lifting-rod I is kept elevated until by the further movement of the arm C the pawl $c$ reaches the point of the ratchet-tooth, when it is shot upwardly by its spring, releasing the lever J, which, by reason of the weight $i$, tilts into the position shown in Fig. 7 and withdraws the lifting-rod from the chuck-jaws. It is while the pawl is riding on the horizontal portion $i^2$ of the ratchet-tooth that the discharging-arm sweeps horizontally across the chuck-jaws and throws the button outwardly into a receptacle. This discharging-arm K is pivoted on top of the sleeve $e'$, which guides the dog E, and between its pivot and its free end engages, by means of a slot, with the upwardly-extended end of the pin $e^3$ carried by the dog E, so that when the lever F is forced outwardly toward the end of the right movement of the lever D the discharging-arm K will be given an outward movement by reason of its connection with the dog E. The free end of the lever K terminates in a hood $k$, which covers the button as it is lifted by the lifting-rod and sweeps the button off of the table when the discharging-arm is moved outwardly. A slot $k'$ in the inner side of the hood $k$ enables the hood to ride over the raised end of the lifting-rod without striking it. It is not until the discharging-lever has made its outward movement and discharged the button that the pawl $c$ leaves the horizontal surface $i^2$ of the ratchet-tooth and rises into the succeeding notch, when the tilting of the lever J thus released retracts the lifting-rod.

From the description of the parts just referred to the manner of discharging the buttons from the machine is made clear.

The arrangement and operation of the drilling and forming tools will now be described. Upon the top of the base-plate, where it projects beyond the rotating table on the rear side of the machine, are cast a number of hollow posts L, the number of these posts corresponding to the number of tools to be employed. In the case of the machine illustrated, using two drills and one forming-tool, to act upon a button having two holes, there are three of these hollow posts; but if the machine was one intended to produce a button with four holes there would be two more posts for the additional drills, and if it was designed for two forming-tools, as it might be, it would have an extra post for the second forming-tool. Mounted in each of the hollow posts L is a bolt L', adapted to turn axially in the post and fixed in any definite position by one or more set-screws $l$. Each bolt L' is bored with a horizontal opening at its upper end, in which is inserted a horizontal arm M', cast in one piece with and projecting rearwardly from a bracket M. The arm M' is capable of rotary adjustment in the bolt L', and is held in any definite position by one or more set-screws $m$. It can also be adjusted longitudinally in the bolt L' and held by the same set-screws. By means of the rotary adjustment of the bolt L' in the post L, and the rotary and longitudinal adjustment of the arm M' in the bolt, the bracket M can be given any desired position with relation to the chucks, so that the tool whose spindle is carried by the bracket can be arranged to act upon the button-blank at the proper point and at the proper angle. The bracket M has upper and lower bearings $m'$ $m^2$, through which passes a rotating spindle N, provided between the bearings with a pulley $n$, by which it is rotated. From this pulley to near its upper end the spindle N is covered by a sleeve N', flattened on one side, as shown in Fig. 1, and fitting a correspondingly flat surface in the upper bearing, $m'$. In the vertical sliding movement of the spindle, the sleeve N' moves vertically through the bearing $m'$ and is guided therein, while the spindle in its rotation has a long bearing in this sleeve and also turns in the bearing $m^2$. The upper ends of all the spindles are rounded and bear against blocks $n'$, preferably of hard wood, which are secured by set-screws $n^2$ in a frame O, which extends over all the spindles. The upper ends of the sleeves N' are flanged, and beneath these flanges extend the forked ends of arms $o$, which are secured to the under side of the frame O and draw the sleeves upwardly when the frame is raised. On the upper end of each spindle N, above the flanged end of the sleeve N', the spindle is provided with a collar $o'$, secured to it by a set-screw and bearing upon the upper end of the sleeve N', the bearing-surface being reduced to two studs $o^2$, so as to diminish the friction. The frame O is carried by three or more vertical rods P, which are screw-threaded at their upper ends and are secured to the frame by means of nuts $p$ above and below the frame, by means of which an adjustment can be effected. These rods P extend downwardly through the bearings in the bed-plate A, and beneath the bed-plate are connected by a frame Q, upon which a knuckle $q$ from the lever D bears.

The lever D is prevented from being disengaged from the frame Q by means of an extension $q'$ on the frame, and, further, by means of a pin $q^2$ on the lever playing under a strap $q^3$ on the frame. By pressing the lever downwardly its knuckle $q$ will force the frame Q downwardly, thus drawing down upon the rods P and producing a downward movement of the frame O and of the spindles N. The frame O is thrown upwardly by spiral springs R. The upward movement of the frame O may be limited by a collar $p'$ secured to one of the rods P beneath the bed-plate.

It will be seen that when the movement to the left of the lever D is completed, bringing a new blank under each one of the tools, a downward movement of this lever will then be made, bringing the tools down upon the button-blanks and causing them to simultaneously perform their operations upon different blanks. The lever D will then be raised, disengaging the tools from the blanks, before the movement of that lever to the right is made. Hence to accomplish all the functions of the machine the lever D is moved from the position shown in Fig. 1, first, horizontally to the right; second, horizontally to the left, and, third, vertically, down and up, while at the limit of its movement to the left.

The spindles N carry at their lower ends chucks $r$ for holding the tools. In the machine shown, which is adapted for drilling two holes in the button, as well as for forming a depressed center upon its face, the two spindles to the right of the machine carry drilling-awls S, while the spindle at the left of the machine carries a centering-tool T. One of the drilling-awls is shown piercing a button-blank in Fig. 23. It will be seen that the drilling-awl passes obliquely through the button-blank, but it may pass vertically through the same, or it may be given any desired angle by means of the adjustment of the bracket M. The centering-tool T has a square cutting-edge, which is brought vertically down upon the button, as shown in Fig. 19, cutting away the center of the blank and forming a depressed center. This centering-tool may be given any desired form. Another style of forming-tool is shown at U in Figs. 21 and 22. This tool has a circular cutting-edge, which is brought vertically down upon the blank, cutting upon its surface an annular groove encircling the center of the blank. In Figs. 24 and 25 is shown a forming-tool W, which is a steel tool brought to an edge, having the contour that it is desired to give the face of the button. As shown in Figs. 26 and 27, the same shape can be given to the button by a tool W', which is a solid circular tool having the reverse of the shape of the button. This tool may be of steel with its face serrated, or it can be made of emery, corundum, or any suitable abrasive material. The forming-tools T, U, and W, or W', may be used upon the machine simultaneously or independently, according to the form which it is desired to give the button, a sufficient number of chuck-spindles, of course, being employed.

All the tools of the machine act simultaneously upon the blank, whether two or more drilling-tools are employed. Since the drills must pass entirely through the blank, while the forming tool or tools only act upon the face of the blank, it is evident that the drills must act in advance of the forming tool or tools, which action is accomplished by making the drills longer than the forming-tools.

In operating the machine the action of the forming-tool alone is observed by the operator, since when that is sufficiently advanced the drills will have passed through the blanks, and it is unimportant whether the drills pass through more or less.

Plates V are secured to the top of the table B and cover the joints between the plates $G^2$ and the center of the table, so as to prevent the button-blanks from dropping into the holes $h$ of the plates $G^2$ as they are moved across into the chuck-openings. The spindles N are rotated by one or more driving-belts encircling the pulleys $n$, the belts after leaving the pulleys being of such length and so guided, as will be well understood, that the vertical movement of the pulleys with their spindles is permitted without disturbing the driving of the pulleys by the belt or belts. The power connection, therefore, is entirely with the spindles N, which are driven continuously at a proper rate of speed, the forming-tools being driven preferably somewhat slower than the drills, while all the other movements of the machine are performed by the operator through the hand-lever D.

What we claim is—

1. In a button-making machine, the combination with a blank-carrier having an intermittent movement and carrying two or more button-blanks which are presented to the tools successively, of forming and drilling tools operating simultaneously upon different blanks and successively upon the same blank during the intervals of rest of the carrier, substantially as set forth.

2. In a button-making machine, the combination with a blank-carrier having an intermittent movement and carrying two or more button-blanks which are presented to the tools successively, of rotating forming and drilling tools operating simultaneously upon different blanks and successively upon the same blank during the intervals of rest of the carrier, substantially as set forth.

3. In a button-making machine, the combination with a blank-carrier having an intermittent movement and carrying two or more button-blanks which are presented to the tools successively, of two or more rotating drills operating simultaneously upon different blanks and successively upon the same blank during the intervals of rest of the carrier, substantially as set forth.

4. In a button-making machine, the combination with a table, of two or more blank-carrying chucks having an intermittent movement and presenting the blanks to the tool or tools successively, the chuck-opening being flush with or below the surface of said table, whereby the blanks can be fed into the chucks by a horizontal sliding movement, substantially as set forth.

5. In a button-making machine, the combination with a horizontally-rotating table, carrying a number of blank-holding chucks opened automatically by the movement of the table at the points to receive and discharge the blanks and buttons, of two or more rotating tools acting upon the blanks simultaneously, and a discharging device for discharging the completed buttons, substantially as set forth.

6. In a button-making machine, the combination, with the rotating feed-table, of a number of pivoted chuck-jaws, mounted upon the periphery of the same and kept closed by springs, and cams over which the chuck-jaws ride, acting to open such chuck-jaws at the points for receiving and discharging the blanks and buttons, substantially as set forth.

7. In a button-making machine, the combination, with a rotating feed-table, of a number of split chuck-jaws, mounted upon the periphery of said table, the chuck-jaws of each set being pivoted together at one end and having a wedge-point at the other end, spring-plates forcing the wedge-shaped points of the jaws together, and cams for opening the jaws at the points for receiving and discharging the buttons and button-blanks, substantially as set forth.

8. In a button-making machine, the combination with the movable carrier, carrying a number of blank-holding chucks, of the lifting-rod and swinging discharge-arm for discharging the buttons from the chuck, substantially as set forth.

9. In a button-making machine, the combination with the rotating feed-table, of the oscillating arm for rotating said table, a lifting-rod for raising the button out of a chuck, and a throwing-arm for removing the button raised by the lifting-rod, substantially as set forth.

10. In a button-making machine, the combination with the rotating feed-table, of automatically-opening chuck-jaws carried thereby, an oscillating arm for rotating said table, a lifting-rod for raising the button out of a chuck, an operative connection between said lifting-rod and oscillating arm, a swinging discharge-arm for removing the button raised by the lifting-rod, and means operated by the oscillating arm for operating said discharge-arm, substantially as set forth.

11. In a button-making machine, the combination, with a rotating feed-table, of the drill-spindles mounted in brackets having adjustments around vertical and horizontal centers, substantially as set forth.

12. In a button-making machine, the combination with the drill-spindles capable of vertical movement, of the frame O resting on the upper ends of said spindles, rods P connected with said frame O, frame Q secured to the lower ends of rods P, and lever D engaging with said frame Q to impart movement to said drill-spindles, substantially as set forth.

13. In a button-making machine, the combination with the rotating feed-table, of the oscillating arm C moving the table by a step-by-step movement, a hand-lever D capable of horizontal and vertical movement, an operative connection between arm C and lever D for imparting the horizontal movements of said lever to said arm, a frame O for depressing the tool-spindles, and an operative connection between said frame and lever D for imparting the vertical movement of said lever to said frame, substantially as set forth.

14. In a button-making machine, the combination, with a button-holding chuck, of the lifting-rod lifting the buttons out of the chuck, and the swinging discharging-arm having a hood for inclosing the buttons and a slot for clearing the lifting-rod in its movement, substantially as set forth.

This specification signed and witnessed this 23d day of April, 1892.

GEORGE CARLYLE.
WILHELM NAGEBORN.

Witnesses:
JOHN H. POWELL,
LOUIS JALINCHEN.